June 14, 1960 L. E. DALY ET AL 2,940,887
RUBBER-BASE FLOOR MATERIAL AND METHOD OF MAKING SAME
Filed April 11, 1955 3 Sheets-Sheet 3

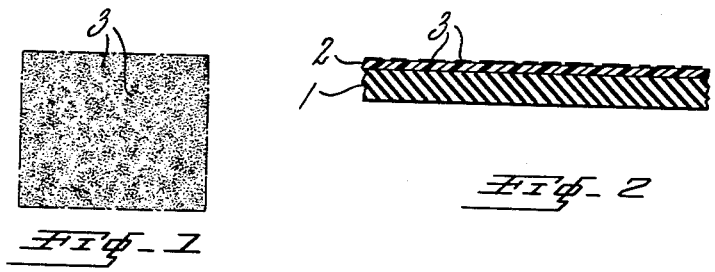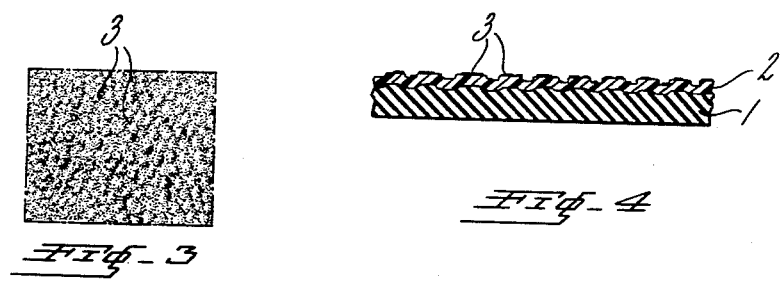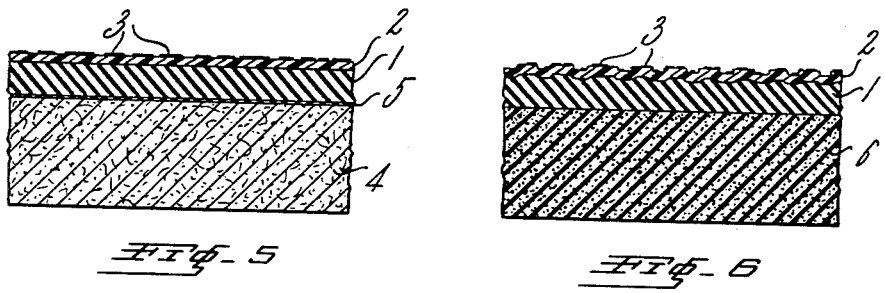

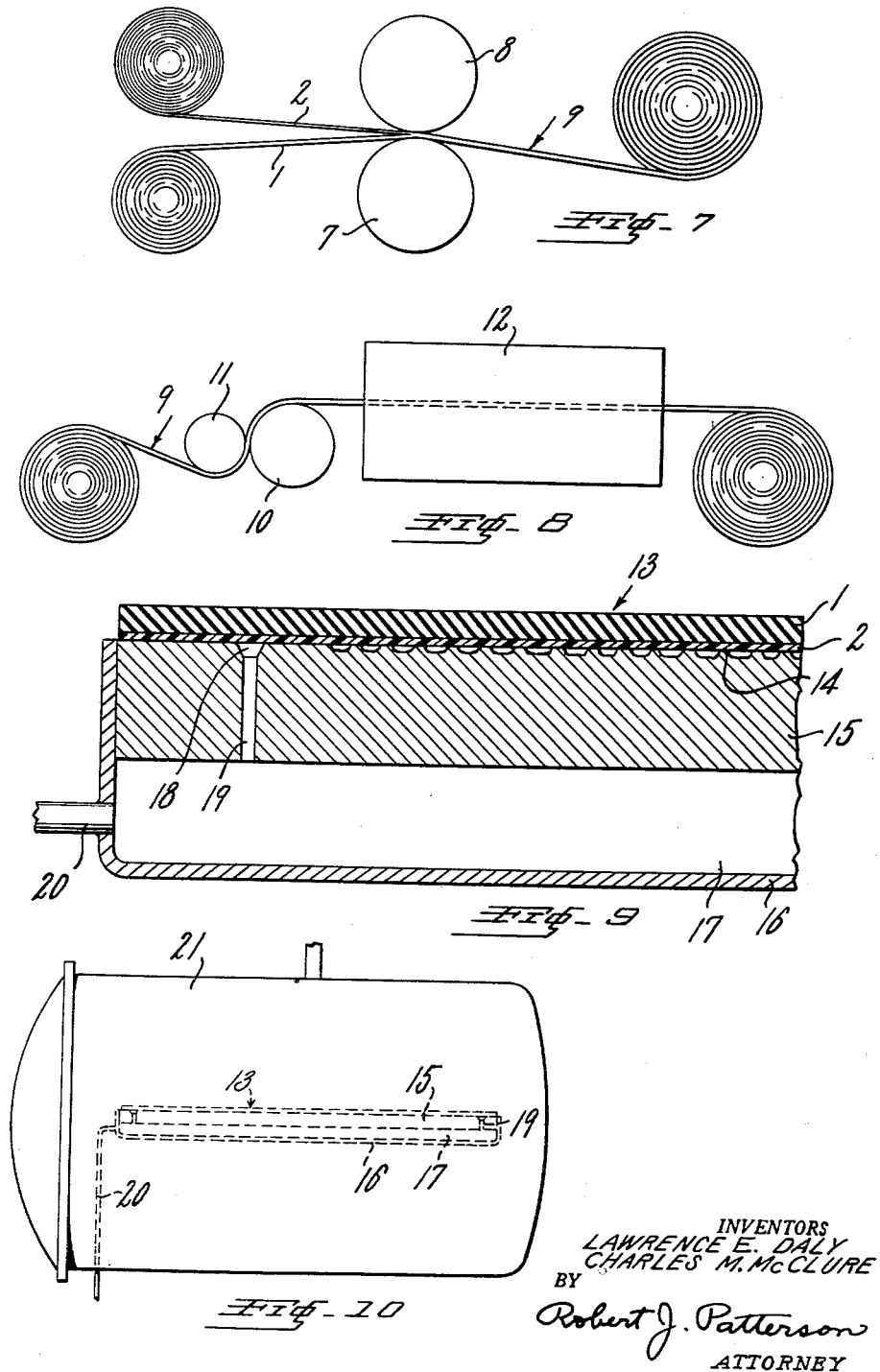

INVENTORS
LAWRENCE E. DALY
CHARLES M. McCLURE
BY
Robert J. Patterson
ATTORNEY

United States Patent Office 2,940,887
Patented June 14, 1960

2,940,887

RUBBER-BASE FLOOR MATERIAL AND METHOD OF MAKING SAME

Lawrence E. Daly, Mishawaka, Ind., and Charles M. McClure, Niles, Mich., assignors to United States Rubber Company, New York, N.Y., a corporation of New Jersey Filed Apr. 11, 1955, Ser. No. 500,622

11 Claims. (Cl. 154—106)

This invention relates to improved flooring material especially adapted for use in making automobile floor mats, and more particularly to automobile floor mat material which has far superior wearing characteristics to the rubber automobile floor mat material now being used by automobile manufacturers. The flooring material of our invention is much more attractive in appearance than formed and shaped rubber-base materials presently being used by automobile manufacturers. Not only does the material of our invention take and retain an embossed design more readily than prior art materials but also it takes and retains in a better way the shape imparted in the molding operation; both factors contribute to better "styling" as it is termed in the art.

It is well-known that the rubber-base floor materials used by automobile manufacturers at the present time are deficient in wearing characteristics and in appearance. U.S. patent to Blair et al. No. 2,338,002 describes a typical method of making the conventional rubber-base floor mats. During the manufacture of conventional floor mats, the unvulcanized rubber sheet is formed or shaped during vulcanization so as to have a configuration corresponding to that of the automobile floor, shaping methods being described in the aforementioned patent. Such rubber-base floor mats have not exhibited a desirably long service life, it being necessary to replace them several times during the life of the car. In addition, as will appear more fully from the wear tests reported in the example below, such rubber-base floor mats soon show signs of wear. Furthermore, attempts to provide an attractive contrasting printed design on the surface of such rubber-base floor mats have not been successful because the printed design wore off with extreme rapidity.

Automobile manufacturers have recognized the aforementioned shortcomings of conventional rubber-base floor mat materials and have recognized that it would be desirable to have a floor mat which would last much longer, which would be capable of receiving and holding for a long time a printed surface design, and which could be shaped or formed to the desired configuration with greater accuracy whereby a more attractive appearance would result. Attempts have been made to accomplish these objectives by providing a backing layer of the conventional rubber composition and securing thereto a long-wearing layer of a vinyl resin composition. However, it did not prove to be possible to make a satisfactory material in this way.

Our invention provides a simple and commercially feasible way of achieving the foregoing objectives and overcoming the shortcomings of the conventional rubber-based floor mat material. Our invention does this without adding to the cost of manufacture of automobile floor mats. Our invention provides a floor mat which will last as long as the average car in ordinary passenger travel. Numerous other aims and objectives of our invention will more fully hereinafter appear.

In the accompanying drawings:

Fig. 1 is a plan view of one form of floor mat material made by our invention.

Fig. 2 is an enlarged section through the material of Fig. 1.

Fig. 3 is a plan view of floor mat material made by our invention and embossed during curing.

Fig. 4 is an enlarged section of the material of Fig. 3.

Fig. 5 is a section showing the material of Figs. 1 and 2 applied to the conventional jute fiber cushion.

Fig. 6 is a section of a material like that shown in Figs. 3 and 4 but having sponge rubber applied to the side opposite the wearing surface, this sponge rubber being blown, cured and vulcanized to the overlying rubber layer.

Fig. 7 portrays diagrammatically the step of laminating the layers of uncured base and wear-resisting stocks together.

Fig. 8 shows printing of the exposed surface of the wear-resisting layer.

Fig. 9 shows the step of pulling a blank of the stock against an embossed mold by use of vacuum; whereby sealing of the blank with respect to the mold is obtained, with the result that good embossing during curing is obtained;

Fig. 10 shows the final curing step.

Figure 11:
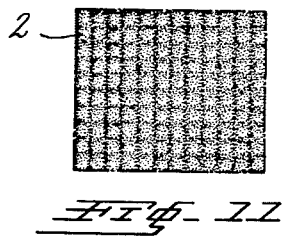
Figure 12:
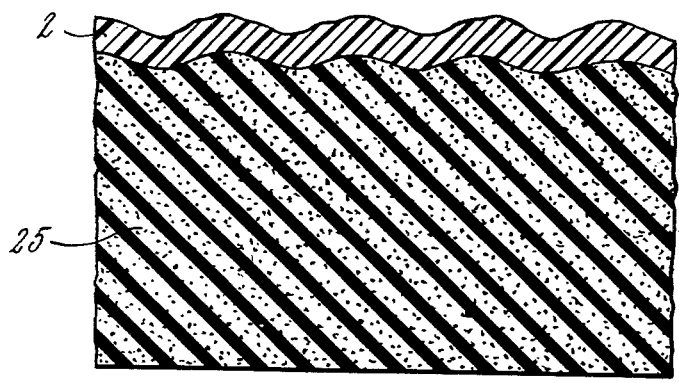

Fig. 11 is a plan view of an alternate floor mat construction of our invention in which the underlying rubber layer is blown to sponge form simultaneously with the embossing and vulcanizing step;

Fig. 12 is an enlarged section through the material of Fig. 11; and

Figure 13:
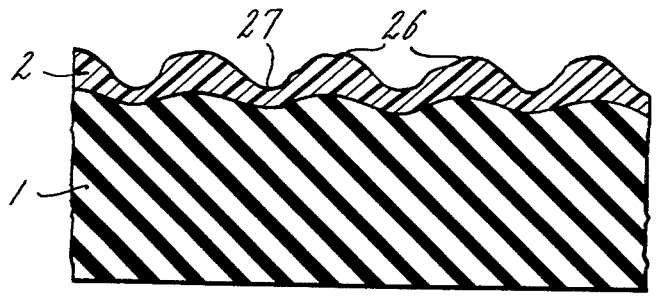

Fig. 13 is an enlarged diagrammatic section of embossed floor mat material made in accordance with our invention with a solid underlying rubber layer, showing the way in which the wear-resisting stock is selectively distributed during the embossing so that relatively more of it is disposed at the high points which receive the greatest wear and relatively less is disposed in the valleys. The showing in this figure is somewhat exaggerated to emphasize this preferential distribution of the wear stock.

We have found that an automobile floor covering material or the like having a much more attractive appearance and a much longer service life can be made by providing a vulcanized laminate of an underlying vulcanized rubber layer (typically formed either of the conventional solid vulcanized rubber stock commonly used for making solid rubber automobile floor mat material or of sponge rubber blown and simultaneously vulcanized to the wear-resisting layer presently to be described) with a wear-resisting rubber-resin layer formed from a vulcanized homogeneous blend of (1) from 50 to 95% by weight of natural rubber, a rubbery copolymer of butadiene and styrene, a mixture of natural rubber and such rubbery butadiene-styrene copolymer, or a rubbery copolymer of butadiene and acrylonitrile, and (2) correspondingly from 50 to 5% of a hard thermoplastic resinous copolymer of from 70 to 90% of styrene and correspondingly from 30 to 10% of butadiene, the material in each of these layers being vulcanized and these layers being simultaneously vulcanized to each other at their interface during vulcanization of the laminate.

We have found that by using such a laminated structure it is possible (in the case of a solid construction wherein the rubber layer below the wear-resisting rubber-resin layer is not blown) to make the underlying rubber layer much thinner than in a conventional automobile floor mat with the result that the laminate of our invention costs no more than all-rubber floor mat material of the type used heretofore. In other words, the wear resisting layer of our laminate has so much better wear-resistance than conventional rubber floor mat material that it is possible to reduce the thickness of the rubber layer so as to offset the higher cost of the wear-resisting layer and produce a final mat which is actually a lower cost flooring than present rubber mat material. For example, we can by our invention make a much better wearing flooring at no higher cost by using only one-half the thickness of the ordinary rubber layer and a layer of the wear-resisting stock only 0.010 of an inch in thickness. Thus by replacing a considerable proportion of the thickness of the present type mat (which typically is about 0.100" thick) with only 0.010" of the wear-resisting stock a mat which will wear about 8 times as long as the present mat is obtained. At the same time we obtain much better appearance and the other advantages described herein.

We especially prefer to use from 70 to 80% of the rubber and from 30 to 20% of the styrene-butadiene resin in the wear-resisting layer.

We have also found that if the exposed surface of the aforementioned wear-resisting layer be printed with a design prior to vulcanization of the laminate, using an ink comprising a pigmented solution of rubber, e.g., natural rubber or a butadiene-styrene rubbery copolymer, this solution comprising vulcanizing ingredients for the rubber portion thereof, there is produced a floor mat having a considerably enhanced initial appearance and being capable of retaining this appearance over an extremely long period of service. The rubber in this printed design is vulcanized during vulcanization of the laminate. When such a printed design is applied, it is preferred that the wear-resisting layer be highly pigmented so as to provide a contrasting appearance.

In practicing our invention, we ply up layers of the unvulcanized stocks, each containing vulcanizing agents of type and amount such as to vulcanize the rubber content to a soft rubbery state, and then vulcanize the laminate whereby the rubber contained in the individual layers is vulcanized and the layers are vulcanized to one another at the interface so as to form a strong integral bond. A truly integral bond is achieved because the resin in the wearing layer is fully compatible with the rubber of the underlying layer.

Most automobile floor mats have an irregular contour due to irregularities in the floor. When making floor mats of irregular contour, we "form" them during manufacture by laying a blank of the uncured plied-up laminate on a hollow form having a configuration like that of the floor of the automobile in which the mat is to be used, applying vacuum within the form to pull the entire blank into accurate conformity with the form over the entire area of the blank, and then placing the assembly of the form and blank into a suitable vulcanizer in which it is surrounded by steam at a suitable vulcanizing pressure until vulcanization has been accomplished.

In the preferred practice of our invention, we impart a suitable three-dimensional configuration, i.e., an embossed surface, to the wear-resisting layer (whether printed with a design or not), this preferably being done during vulcanization of the laminate by carrying out the vulcanization in a mold wherein the wear-resisting surface of the laminate is pressed against a heated molding surface (preferably metallic for high specific heat, good heat transmission and good molding properties) having the negative of the desired design, e.g., a molding surface which is engraved or otherwise formed with the negative of the desired embossed design.

We prefer to accomplish simultaneous embossing and vulcanization by laying a cut blank of the laminate upon the heated embossed molding surface, with the wear-resisting layer next to the molding surface, applying a vacuum around the entire periphery of the molding surface to pull the edge of the blank into tight sealing relationship with said periphery and thereby insure that the subsequently applied steam pressure is effective to push the blank tightly against the embossed molding surface so as to effect the desired embossing and make it impossible for the surrounding steam to get between the blank and the molding surface, thereafter causing steam pressure to build up on the outside of the blank while continuing the application of vacuum until the steam pressure is adequate to maintain the seal, then discontinuing the vacuum and continuing the application of steam under pressure, until vulcanization is complete. The rubber-resin mixture of the wear-resisting layer flows much better during vulcanization and therefore takes the embossing much more accurately than ordinary rubber resulting in enhanced sharpness of design; this contributes greatly to the improved appearance of an embossed mat made by our invention.

If desired, vacuum can be applied at any irregular portions of the forming mold to prevent pocketing of air between the blank and the mold at such portions and to insure close conformity of the final mat with the shape of the mold.

The molding surface is preferably made of metal and is preferably of much greater thickness than the blank so as to possess good strength and resistance to distortion during the application of vacuum and steam pressure. By having it of metal and of relatively great thickness relative to the blank, it is also insured that it will retain a large amount of heat from a previous cure cycle and rapidly supply this heat to the blank so as to effect the rapid softening of the wear stock where it touches the high points of the molding surface, thereby effecting the desirable preferential distribution of the wear stock so that it is thicker in the high portions of the final mat than in the low portions, as described more fully hereinafter.

The molding surface is preferably at an initial temperature of at least 250° F., and typically is at a temperature of 260-290° F., when the blank is placed thereon, so as to effect the above-mentioned preferential distribution of the wear stock. In factory operation such a temperature is readily attained without a special heating step by simply using a mold which is still hot from a previous curing cycle. Since the curing is usually finished at a temperature of about 298 to 338° F. (corresponding to 50-100 pounds steam pressure) and since the metal molding surface has high heat capacity, its temperature will usually be substantially above 250° F., say 260-290° F., when the new blank is laid down. In factory operation, the interval between curing cycles is very short and the application of vacuum and building up of curing steam pressure around the mold are very rapid, so that preferential distribution of the wear stock is readily attained.

As previously indicated, the relatively thick backing layer can be made from any conventional rubber formulation of the type commonly used for making the present rubber-faced automobile floor mats. Because it is not subjected to abrasion, it is not necessary that the rubber content thereof be 100% virgin rubber. On the contrary, reclaimed natural rubber or reclaimed rubbery copolymer of butadiene and styrene can be used in large proportion in this rubber backing layer.

A typical method of practicing our invention (in the embodiment wherein the rubber under-laying is solid) is as follows: we separately compound the rubber base stock from which the underlying layer is made and the rubber-resin wear-resisting stock in any suitable manner, including in each stock conventional vulcanizing ingredients and any other desired compounding ingredients such as anti-oxidants, softeners, fillers and pigments. The two stocks are then sheeted out to form continuous sheets of the desired thicknesses. Typically the backing layer has a thickness of from 0.030 to 0.110" and the rubber-resin wear-resisting layer has a thickness of from 0.006 to 0.050". These sheets are then laminated together by passage through the nip of two cooperating rolls which serve to press the two sheets together. Preferably the rolls are heated to from 140° F. to 200° F. Because of the relative thinness of the sheets the temperature of the stock at the nip will be substantially the same as the rill temperature. The heat and pressure exerted by the rolls cause the two sheets to adhere quite tenaciously to one another at the interface. The temperature to which the stocks are heated in this step should be well below the temperature at which vulcanization would occur. The resulting laminate can either be rolled up, typically using a suitable liner, or it can be immediately passed to the printing operation. In the printing step, which is optional, and which is carried out in a manner well-known to those skilled in the art, preferably continuously, the exposed surface of the rubber-resin layer of the laminate is given a discontinuous design using a rubber-base ink. The ink is preferably made by dissolving rubber of a type known to be compatible with the rubber used in the rubber-resin wearing surface, typically natural rubber or GR-S, in a volatile organic solvent, pigmenting the solution, and incorporating conventional vulcanizing agents for the rubber therewith. If desired, up to half of the rubber component of the ink can be replaced with a high styrene-low butadiene synthetic resin, i.e., a resinous copolymer of from 70 to 90% of styrene and correspondingly from 30 to 10% of butadiene, such as is used in the rubber-resin wearing layer. Following application of the ink, the solvent is of course allowed to evaporate at room or only moderately elevated temperature whereupon the laminate is ready for the molding and vulcanizing step which completes the manufacture of the floor mat.

Blanks of a suitable size for the manufacture of the final floor mat are now cut from the printed or unprinted laminate and are subjected to molding and vulcanization in any suitable manner. We can proceed in the ways shown in the above-mentioned patent to Blair et al. We prefer to form the floor mat by initially applying a vacuum on the mold while steam pressure on the outside of the blank is being built up, the purpose of this vacuum being to draw the laminate into close conformity with the mold preparatory to vulcanization so as to ensure application of vulcanizing steam pressure uniformly against the blank, resulting in the blank being pressed uniformly against the molding surface and in accurate forming of the laminate so as to exactly reproduce the contours of the mold design. Alternatively we can use cooperating male and female molds, although their use is much more costly.

Where it is desired to form the aforementioned embossed design in the wear layer, as will often be the case because of the enhanced skid-resistance and attractiveness of such a design, we prefer to use the molding technique described below in connection with Figs. 9 and 10, whereby vulcanization, bonding, forming and embossing are carried out in a single operation and in a simple and economical manner.

Referring to the drawings in detail, Figs. 1 and 2 portray an unembossed printed laminate of our invention. This laminate comprises a rubber backing layer 1 and a rubber-resin wear-resisting layer 2. A design 3, is printed on the exposed surface of layer 2.

In Figs. 3 and 4 the exposed printed surface of layer 2 is embossed, the embossing being done during the vulcanization of the laminate.

Generally the laminates of Figs. 1 to 4 will be provided with a resilient, compressible, cushioning backing layer of relatively great thickness. In Fig. 5 the laminate of Figs. 1 and 2 is provided with a fibrous backing layer 4, which preferably is made of jute fiber, layer 4 being secured to the lower face of the laminate by means of a layer 5 of conventional rubber cement. Backing 4 is applied after the laminate has been cured.

Fig. 6 portrays an alternative form of backing composed of a layer 6 of sponge rubber. Sponge rubber layer 6 was formed by laminating to the underside of the laminate of Figs. 3 and 4, prior to vulcanization thereof, a layer of unblown unvulcanized sponge rubber stock compounded with blowing and vulcanizing agents in the conventional manner. The curing of all rubber elements of this laminate, the blowing of the sponge rubber stock, and adhesion of the sponge rubber layer 6 to the lower face of rubber layer 1 occur during the curing cycle in the mold. In this embodiment of our invention, rubber layer 1 may have a thickness in the lower portion of the range given above, for example, from 0.030 to 0.040".

In Fig. 7 layers 1 and 2 of base stock and face material, respectively, are passed through the nip of heated laminating rolls 7 and 8 to form an uncured laminate 9. In Fig. 8 this laminate 9 has the exposed surface of the wear-resisting layer 2 printed by passage around printing roll 10 which applies a design thereto. The laminate is pressed against printing roll 10 by means of roll 11. The printed laminate then passes through a dryer 12 wherein the solvent is evaporated. The dried printed laminate can then be rolled up preparatory to cutting into blanks and the final molding and vulcanizing operations.

In Fig. 9 a blank 13 of the uncured printed laminate is laid upon the embossed upper face 14 of rigid mold member 15 which preferably is at an initial temperature of at least 250° F. to promote the desired selective distribution of the wear stock of layer 2. The embossed portion 14 of mold 15 is surrounded by an unembossed border portion which is used to effect sealing at the edges during molding and to give an unembossed border portion in the final mat. Member 15 is rigidly postioned in a hollow shell 16 in such a way as to form a vacuum chamber 17 which is connected at spaced intervals to a groove 18 extending completely around the mold by means of vacuum ports 19 which serve to transmit the vacuum to the continuous groove 18. Vacuum is applied to chamber 17 and thence to depression 18 by means of vacuum line 20. The purpose of applying vacuum is to hold the edge portion of the blank 13 tightly against the unembossed surrounding portion of member 15 so as to prevent the access of steam between the blank 13 and the embossed surface 14 of mold 15 during the final curing step which would result in inadequate embossing.

After the application of vacuum to the mold, the mold is placed in autoclave 21 while continuing the application of the vacuum through line 20. The autoclave is closed and steam pressure is allowed to build up therein while continuing the application of vacuum on the mold until steam pressure in the autoclave is substantially in excess of atmospheric. At that point the mold is vented, i.e., line 20 and chamber 17 are connected to the outside atmosphere. The steam pressure in the autoclave is allowed to continue to rise until it reaches a value suitable for vulcanizing, say from 50 to 100 pounds per square inch gage (298 to 338° F.), typically 70 pounds per square inch gage (316° F.). Preferably the steam pressure is allowed to reach at least 15 pounds per square inch gage before the application of vacuum is discontinued and the hollow portion of the mold is connected to the atmosphere.

During the application of the vacuum the differential between atmospheric pressure or the initially applied steam pressure and vacuum pushes the stock tightly against the mold. After connection of the chamber 17 to the outer atmosphere the differential between the steam pressure in the autoclave and atmospheric pressure forms the stock securely against the mold. The application of steam at a pressure of 50 to 100 pounds per square inch gage pushes the stock firmly against the mold thereby imparting to it the embossed design 14 as well as curing it.

It will be obvious that if desired the molding form 15 against which the mat is molded can have a configuration like that of the floor of the automobile; thus it may have an elevated central portion to correspond to a similar portion in the floor of the car. If desired, vacuum ports can be provided through the mold 15 at any such irregular portions.

The technique portrayed in Figs. 7 to 10 can be used to make the sponge rubber-backed material of Fig. 6 by simply employing a layer of uncured and unblown sponge rubber stock which is plied-up with layers 1 and 2. The sponge rubber stock is blown and vulcanized simultaneously with the vulcanization of layers 1 and 2 and embossing of layer 2. The layer of the sponge-forming stock is simply disposed above the layer 1 of solid stock in Figs. 9 and 10.

Figs. 11 and 12 portray a construction from which the solid rubber layer 1, described above in connection with Fig. 6, has been entirely omitted. The construction shown in Figs. 11 and 12 has the embossed wear-resisting layer 2 directly over a sponge rubber cushioning layer 25. This construction is made by preparing a sponge rubber stock, containing rubber, a chemical blowing agent, vulcanizing agents and any other desired compounding agents, calendering this stock into sheet form, laminating the resulting sheet to the uncured rubber-resin stock and proceeding in the manner already described with reference to the non-cellular rubber layer (Figs. 7 to 10), whereby the rubber stock of layer 25 is blown, the rubber content of layers 2 and 25 is vulcanized, layers 2 and 25 are vulcanized to each other and layer 2 is embossed. As a matter of fact, both sponge rubber-backed and solid rubber-backed mats can be finished at the same time in the same vulcanizer.

We wish to point out that the sponge rubber-backed material of the type shown in Figs. 11 and 12 is especially adapted for flat mats or mats with slight draws. This material is not especially adapted for mats with deep draws because of an undesirable tendency to puncture easily at the locations of concave radii when deeply drawn in the "forming" process. For deeply drawn mats, material with a layer of solid rubber directly under the wear layer is preferred.

As shown in Fig. 13, the step of embossing (while curing) the wear layer 2 results in preferential distribution of the wear stock whereby more of it accumulated in the high portions 26 of the embossed pattern where wear is greatest and less of it accumulates in the low portions 27 which receive very little wear. The thinning out of wear layer 2 is greatest at the points of first contact with the ridges or high points of the heated embossing mold 15. As the plastic (rubber-resin) face of the blank is placed against the embossing mold 15, which is initially at a temperature of at least 250° F., say 260–290° F., the thermoplastic rubber-resin layer if caused to soften first at the areas which will finally be the depressions of the finished mat. When the vacuum is applied beneath the mold, atmospheric pressure (and thereafter steam at a pressure increasing up to that used in curing and embossing) is applied to the upper face of the blank causing the wear stock to be forced into the valleys (or low points) between the ridges of the mold; the thinning out is greatest at the high points of the mold and decreases from the high points to the low points where the greatest thickness is deposited. Of course the valleys in the mold become the high points in the finished mat. The thinning out at the high points of the mold is not sufficiently great to cause failure.

The above-described preferential distribution of the relatively expensive wear stock due to the controlled flow thereof, during the embossing and vulcanizing step, into the indentations of the embossing mold without breaking the continuity of the wear stock at the high points of the mold is extremely advantageous since it greatly reduces the cost of the long wearing, attractive, embossed mat material of our invention.

When making material embodying a sponge rubber layer, i.e., material of the type shown in Fig. 6 or in Figs. 11 and 12, we can effect vulcanization, blowing, forming and embossing at a single temperature or at a series of different temperatures, e.g., first at a relatively lower temperature, say 250–290° F. and then at a higher finishing temperature, say 300–325° F. As an example, we could cure, emboss, etc., first at 20, 30, or 40 pounds steam (259°, 274° and 287° F., respectively) for 3 minutes and finally at 70 pounds steam (316° F.) for 1 minute. By varying the temperature of the initial portion of the cure we can vary the density and compressive resistance of the sponge portion of the product.

An unusual aspect of our invention is that the wear-resisting layer of our laminate takes and holds an embossed or similar design much better than a composition containing rubber alone; this is due to the unique thermoplastic nature imparted to the wear-resisting layer by the high styrene-low butadiene resin. The rubber alone when going through the initial stage of cure is very soft and viscous, tends to flow too much, and will not pick up the design nearly as well as when the styrene-butadiene resin is used.

The following examples illustrate our invention more fully. All parts, proportions and percentages mentioned in this specification are by weight.

*Examples with solid rubber underlayer*

The following formulation is typical of those used in compounding the rubber backing layer 1:

|  | Parts |
|---|---|
| Whole tire reclaim rubber | 310.00 |
| GR–S rubber | 54.00 |
| "Suprex Clay" (filler) | 70.00 |
| Channel black (filler) | 25.00 |
| Hard hydrocarbon (residue from petroleum) | 10.00 |
| "Indonex" (petroleum plasticizer) | 6.00 |
| Palm oil | 1.60 |
| Stearic acid | 1.20 |
| "Piccolyte Resin" (polymers of beta-pinene) | 26.00 |
| Zinc oxide | 4.00 |
| Paraffin wax | 1.00 |
| Benzothiazyl disulfide (accelerator) | 3.00 |
| Sulfur | 3.50 |

The above ingredients were intimately commingled by blending for 5 minutes in a #11 Banbury. The resulting mixture was sheeted out into a layer 0.070″ thick.

The formulations in the following table are typical of those used for the preparation of wear-resisting layer 2. Wear data for these stocks after curing are included in the table.

| Stock | A | B | C | D (oil-resistant) |
|---|---|---|---|---|
| "Kralac A" (Note 1) | 30.00 | 30.00 | 30.00 | 30.00 |
| GR–S Rubber | 35.00 | 100.00 | | |
| #2 Smoked Sheet (natural rubber) | 35.00 | | 100.00 | |
| Paracril B (Note 2) | | | | 100.00 |
| Precipitated calcium silicate (filler) | 50.00 | 50.00 | 50.00 | 50.00 |
| Hydrated aluminum silicate (filler) | | 25.00 | | 25.00 |
| Zinc Oxide | 5.00 | 5.00 | 5.00 | 5.00 |
| Antioxidant ("Stalite") | 2.00 | 2.00 | 2.00 | 2.00 |
| "Circo" oil (plasticizer) | 10.00 | 10.00 | 10.00 | 10.00 |
| Paraffin Wax | 1.00 | 7.00 | 7.00 | 7.00 |
| Cotton Flock (filler) | 7.00 | 7.00 | 7.00 | 7.00 |
| "Resoform green" (color) | 4.00 | 4.00 | 4.00 | 4.00 |
| Benzothiazyl Disulfide | 2.00 | 2.00 | 1.50 | 2.00 |
| Sulfur | 3.00 | 2.00 | 2.00 | |
| Tabor Abrasion Resistance/#18 Wheel 1000 gram load: | | | | |
| Wt. loss (grams)— | | | | |
| 1,000 cycles | no change | no change | 0.31 | 0.21 |
| 5,000 cycles | 1.45 | 1.40 | 1.54 | 1.06 |
| Gage loss— | | | | |
| 1,000 cycles | 0.004 | 0.003 | 0.004 | 0.003 |
| 5,000 cycles | 0.018 | 0.015 | 0.022 | 0.015 |

NOTE 1.—Resinous copolymer of about 85% styrene and 15% butadiene.
NOTE 2.—Copolymer of 74% butadiene and 26% acrylonitrile.

Our preferred composition is stock A, the blend of high styrene-low butadiene copolymer resin, GR–S and natural rubber; this blend has slightly better bond strength to the rubber backing material.

The styrene-butadiene copolymer resins are well known. Examples suitable for the compositions of our invention are "Kralac A" (Naugatuck Chemical), "Pliolite S-6" (Goodyear Tire & Rubber Company), "GoodRite Resin 50" (B. F. Goodrich Chemical Company), "Marbon S" (Marbon Corporation).

The ingredients listed for Stocks A, B, C and D were intimately commingled by mastication in the Banbury mixer. The resulting mixtures were then sheeted out to form sheets 0.006" thick. Layers of the rubber stock and layers of the four wear-resisting stocks were then plied up by passage through the nip of a rubber calender, the rolls of which were heated to 160° F. The exposed surface of each wear-resisting layer was then printed, by passage of the laminate through the nip of a pair of rolls, the roll in contact with the surface of the wear-resisting layer being a printing roll. The following ink formula was used:

| | Parts by weight |
|---|---|
| GR–S rubber | 64.00 |
| Titanium dioxide | 13.63 |
| Red iron oxide | 20.50 |
| Carbon black | 10.25 |
| Zinc oxide | 3.50 |
| Benzothiazyl disulfide | 2.00 |
| Diorthotolylguanidine | 1.00 |

The foregoing ingredients were blended on a rubber mill. The printing ink was made by dissolving 65 pounds of the resulting mixture in 20 gallons of solvent naphtha (B.P. 160–220° C.; flash point about 78° C.).

The solvent of the applied ink was evaporated and the resulting printed laminates were cut into blanks which were formed into automobile floor mats by molding and vulcanizing in the manner described above and portrayed in Figs. 9 and 10 of the drawings.

After vacuum forming in the described manner the printed laminates were cured in the manner portrayed in Figs. 9 and 10 of the drawings for 6 minutes at a steam pressure of 70 p.s.i. gage (316° F.). Alternatively a cure for 9 minutes at 55 pounds of steam can be used.

When other types of apparatus, such as platen presses, are used, vulcanization may be carried out at temperatures ranging from 250° F. to 400° F. and at pressures of from 50 to 500 p.s.i. gage.

Floor mats made according to the foregoing examples were subjected to wear tests under actual taxicab service conditions in comparison with regular rubber-faced automobile floor mats which had been printed with the same ink as was used in the example. At the end of a single day or 200 miles of taxicab driving, a floor mat made with natural or synthetic GR–S rubber showed considerable wear, the ink design being worn through and some of the underlying rubber being gone. In comparison, the mats made according to the foregoing examples were far superior; after 3,000 miles of taxicab service, the printed design on the mat showed very slight wear and the upper rubber-resin face did not wear through at all until 8,000 miles at which time it had three spots worn through about the size of the end of a pencil. Using a standard Tabor abrasion machine test with a #18 wheel and a 1000 gram load, a standard automobile floor mat material made of ordinary rubber and having a thickness of 0.095 inch wore through after 4412 cycles; in contrast a typical floor mat material of our invention, having a solid rubber underlayer and a wear-resisting layer formed from Stock A above after 5000 cycles wore through a depth of 0.012 inch when tested in the same way. These wear tests indicate that in ordinary passenger car service the floor mat of the invention will last as long as the car.

*Example of making sponge rubber-backed material (as in Figs. 11 and 12)*

A sponge rubber stock was prepared by compounding the following ingredients in the normal fashion:

| | Parts |
|---|---|
| Crepe natural rubber | 100.00 |
| SRF carbon black | 3.10 |
| Paraffin oil | 10.25 |
| Whiting | 92.00 |
| Stearic acid | 15.10 |
| Zinc laurate ("Laurex") | 1.52 |
| "Age Rite Stalite" (mono- and di-heptylated diphenylamines) | 1.52 |
| "Retarder W" (salicylic acid) | 0.37 |
| "Reogen" (mixture of an oil-soluble sulfonic acid of high mol. wt. and a paraffin oil) | 2.06 |
| Zinc oxide | 5.00 |
| "Unicel S" Paste (dispersion of finely divided $NaHCO_3$ in oil) | 24.70 |
| "Celogen" (p,p'-oxybis-(benzene sulfonyl hydrazide)) | 2.04 |
| Sulfur | 3.75 |
| "MBTS" (benzothiazyl disulfide) | 1.01 |
| "Ethyl Zimate" (zinc diethyl dithiocarbamate) | 0.41 |
| "RPA #3 (xylyl mercaptan in inert hydrocarbon oil) | 0.08 |

The foregoing stock was calendered into a sheet thick enough to give a layer ¼" thick when blown. The resulting layer was plied up, in the manner shown in Fig. 7, with a layer about 0.020" thick of a rubber-resin mixture like Stock A above except that the "Stalite" and "Cino" were omitted and 6.3 parts of paraffin oil, 3.7 parts of "HSC #13" (a hydrocarbon oil) and 0.3 part of "Cumate" (copper diethyl dithiocarbamate) were used. The resulting laminate was cut into blanks which were placed on flat embossing molds as shown in Figs. 9 and 10 and processed as described above to vulcanize the rubber in each layer, below the sponge-forming layer, vulcanize the layers integrally to each other, and emboss the wear-resisting rubber-resin layer into a non-skid pattern, thereby giving a product as shown in Figs. 11 and 12. The final embossing and cure were carried out at 70 pounds steam pressure. Again, as an alternate, a cure for 9 minutes at 55 pounds steam can be used, or the above-described two-stage cure can be used.

When the rubber layer underlying the wear layer is sponged as portrayed in Figs. 11 and 12, we prefer to use a layer of wear stock having an initial thickness of say 0.020 to 0.040" in order to minimize the tendency to puncture easily at any concave portions formed in the mat. In other words the initial thickness is preferably somewhat greater than where a solid rubber underlayer is used. As a result of the greater initial thickness of the layer of wear stock and the greater yieldability of unblown sponge rubber stock compared to solid rubber stock, the preferential accumulation of the wear-resisting stock in the high portions of the resulting embossed design may be less pronounced than in the case where the underlying rubber layer is non-cellular. This is reflected in Figs. 12 and 13 in which Fig. 13 shows a product made with a thinner layer of wear stock and a solid rubber underlayer.

Although the material of our invention has been described as being especially suitable for automobile floor mats, it will be understood that it can be used for flooring service generally, for example, as flooring for buses and trains, for department stores, for bank tellers' cages and similar applications where unusually severe service is encountered. In applications of the type just mentioned, where extreme resistance to wear is desired, the composite solid rubber-wear resisting laminate may be thicker than mentioned above; for example, it may have a thickness as great as 0.3" or even thicker; also the outer wear-resisting layer may be thicker than the underlying rubber layer, if desired.

From the foregoing description many advantages of our invention will be apparent to those skilled in the art. The principal advantage is that the mats of the invention wear phenomenally well, retaining their initial highly attractive appearance over a long period of use. Where a printed ink design is applied to the surface, its life is greatly enhanced by the rubber-resin wearing surface. The material of the wear layer in the mat of our invention costs more than the underlying rubber stock but it wears approximately eight times better than the lower cost material and its utilization in accordanc with our invention actually gives a lower cost flooring; the unexpected result of our invention is that a much better wearing flooring is obtained at no higher cost by using a much thinner layer of the ordinary rubber stock and only a very thin layer of the wear-resisting stock. In addition, the rubber-resin mixture constituting the wearing surface of our mat is compatible with the underlying rubber layer so that the two are strongly adhered together by the laminating and vulcanizing operations. Also the rubber of the printed ink design is completely compatible with the rubber-resin wearing layer. We are not certain whether or not the much longer life of the printed design is attributable to the fact that the ink penetrates into the rubber-resin layer but regardless of the mechanism, the fact is that a very remarkable improvement in life of the printed design is obtained by interposing a relatively thin sheet of aforementioned rubber-resin composition between the rubber layer and the ink design. Another advantage is the greatly improved appearance and "styling" of the mat of our invention.

This application is a continuation-in-part of our copending application Serial No. 391,844, filed November 13, 1953 now abandoned.

Having thus described our invention, what we claim and desire to protect by Letters Patent is:

1. A new article of manufacture particularly adapted to use as floor covering material, comprising a vulcanized laminate of (1) a flexible underlying layer formed from rubber selected from the group consisting of natural rubber, rubbery copolymers of butadiene and styrene, and mixtures thereof, and (2) a wear-resisting layer formed from a homogeneous blend of (A) from 50 to 95% of rubber selected from the group consisting of natural rubber, rubbery copolymers of butadiene and styrene, mixtures thereof, and rubbery copolymers of butadiene and acrylonitrile and (B) correspondingly from 50 to 5% of a hard resinous copolymer of from 70 to 90% of styrene and correspondingly from 30 to 10% of butadiene, each of said layers being vulcanized and said layers being vulcanized to one another at the interface.

2. An article of manufacture as set forth in claim 1 wherein said underlying layer is non-cellular and is from 0.030 to 0.110 inch in thickness and wherein said wear-resisting layer is from 0.006 to 0.050 inch in thickness.

3. An article of manufacture as set forth in claim 1 wherein said wear-resisting layer is embossed, the material of said wear-resisting layer being distributed with substantially more at the high points than at the low points whereby more of the wear-resisting material is available at the points of greatest wear.

4. An article of manufacture as set forth in claim 1 wherein said underlying layer is sponge rubber.

5. A new article of manufacture particularly adapted to use as floor covering material, comprising a vulcanized laminate of (1) a flexible backing layer formed from rubber selected from the group consisting of natural rubber, rubbery copolymers of butadiene and styrene, and mixtures thereof, and (2) a wear-resisting layer formed from a homogeneous blend of (A) from 50 to 95% of rubber selected from the group consisting of natural rubber, rubbery copolymers of butadiene and styrene, mixtures thereof, and rubbery copolymers of butadiene and acrylonitrile, and (B) correspondingly from 50 to 5% of a hard resinous copolymer of from 70 to 90% of styrene and correspondingly from 30 to 10% of butadiene, each of said layers being vulcanized and said layers being vulcanized to one another at the interface, the outer surface of said wear-resisting layer having a discontinuous design printed thereon from an ink comprising a pigmented solution of rubber in a volatile solvent, the rubber of said design being vulcanized to said outer surface.

6. An article of manufacture as set forth in claim 5, wherein said backing layer is from 0.030 to 0.110 inch in thickness and wherein said wear-resisting layer is from 0.006 to 0.050 inch in thickness.

7. An article of manufacture as set forth in claim 5 wherein the exposed printed surface of said laminate is embossed.

8. The process which comprises laminating together by passing between rolls at a temperature of from 140° F. to 200° F. (1) a flexible layer of a vulcanizable rubber mixture the rubber content of which is selected from the group consisting of natural rubber, rubbery copolymers of butadiene and styrene, and mixtures thereof, and (2) a layer of a vulcanizable mixture comprising a homogeneous blend of (A) from 50 to 95% of rubber selected from the group consisting of natural rubber, rubbery copolymers of butadiene and styrene, mixtures thereof, and rubbery copolymers of butadiene and acrylonitrile, and (B) correspondingly from 50 to 5% of a hard resinous copolymer of from 70 to 90% of styrene and correspondingly from 30 to 10% of butadiene, printing a discontinuous design on the outer surface of said layer (2) in the resulting laminate with an ink comprising a pigmented solution of rubber in a volatile organic solvent, said solution containing vulcanizing ingredients, evaporating said solvent, and vulcanizing the resulting printed laminate by subjecting it to a temperature of from 250° F. to 400° F. while pressing it against an embossed molding surface with the printed surface of said layer (2) adjacent the embossed molding surface.

9. The process which comprises laminating together by passing between rolls at a temperature of from 140° F. to 200° F. (1) a flexible layer of a vulcanizable rubber mixture the rubber content of which is selected from the group consisting of natural rubber, rubbery copolymers of butadiene and styrene, and mixtures thereof, and (2) a layer of a vulcanizable mixture comprising a homogeneous blend of (A) from 50 to 95% of rubber selected from the group consisting of natural rubber, rubbery copolymers of butadiene and styrene, mixtures thereof, and rubbery copolymers of butadiene and acrylonitrile and (B) correspondingly from 50 to 5% of a hard resinous copolymer of from 70 to 90% of styrene and correspondingly from 30 to 10% of butadiene, placing a section of said laminate over a heated molding surface having the negative of the desired embossed design formed therein with said layer (2) adjacent said molding surface, said molding surface being initially at a temperature of at least 250° F., applying vacuum to the peripheral portion of said laminate to pull it into tight sealing relationship with the peripheral portion of said surface, applying steam under pressure on the outside of said section, after the steam pressure is substantially in excess of atmospheric pressure discontinuing application of vacuum, and continuing application of steam pressure at a temperature of from 250° F. to 400° F. to vulcanize the rubber components of said laminate and simultaneously impart the design of said surface to the face of said layer (2).

10. A new article of manufacture particularly adapted to use as floor covering material, comprising a vulcanized laminate of (1) a flexible underlying layer formed from rubber selected from the group consisting of natural rubber, rubbery copolymers of butadiene and styrene, and mixtures thereof, and (2) a wear-resisting layer formed from a homogeneous blend of (A) from 50 to 95% of rubber selected from the group consisting of natural rubber, rubbery copolymers of butadiene and styrene, mixtures thereof, and rubbery copolymers of butadiene and acrylonitrile and (B) correspondingly from 50 to 5% of a hard resinous copolymer of from 70 to 90% of styrene and correspondingly from 30 to 10% of butadiene, each of said layers being vulcanized and said layers being vulcanized to one another at the interface, said wear-resisting layer being relatively thin compared to said underlying layer and being embossed with a pattern the indentations of which do not extend completely through said wear-resisting layer, the material of said wear-resisting layer being distributed with substantially more at the high points than at the low points whereby more of the wear-resisting material is available at the points of greatest wear.

11. The process which comprises laminating together by passing between rolls at a temperature of from 140° F. to 200° F. (1) a layer of a flexible vulcanizable rubber mixture, the rubber being selected from the group consisting of natural rubber, rubbery copolymers of butadiene and styrene, and mixtures thereof and (2) a layer of a vulcanizable mixture comprising a homogeneous blend of (A) from 50 to 95% of rubber selected from the group consisting of natural rubber, rubbery copolymers of butadiene and acrylonitrile, and (B) correspondingly from 50 to 5% of a hard resinous copolymer of from 70 to 90% of styrene and correspondingly from 30 to 10% of butadiene, and vulcanizing the resulting laminate, said layer of vulcanizable rubber mixture comprising a chemical blowing agent so that the rubber mixture is converted to sponge rubber during said laminating step.

References Cited in the file of this patent

UNITED STATES PATENTS

| | | |
|---|---|---|
| 1,805,038 | Derr | May 12, 1931 |
| 1,989,704 | Leguillon | Feb. 5, 1935 |
| 2,036,768 | Morris | Apr. 7, 1936 |
| 2,077,617 | Cramer | Apr. 20, 1937 |
| 2,288,054 | Walton | June 30, 1942 |
| 2,498,652 | Daly | Feb. 28, 1950 |
| 2,586,275 | Toulmin | Feb. 19, 1952 |
| 2,649,134 | Steinle | Aug. 18, 1953 |
| 2,706,698 | Daly et al. | Apr. 19, 1955 |